United States Patent
Williams

[19]

[11] Patent Number: 5,810,601
[45] Date of Patent: Sep. 22, 1998

[54] DENTAL HYGIENE INSTRUCTIONAL DISPLAY

[76] Inventor: John Miles Williams, 63 Breezy Point Pl., Woodlands, Tex. 77381

[21] Appl. No.: 725,303

[22] Filed: Oct. 2, 1996

[51] Int. Cl.$^6$ .................................................. G09B 23/28
[52] U.S. Cl. ......................... 434/262; 434/263; 434/267; 434/270
[58] Field of Search .................... 434/263, 262, 434/267, 270; 40/442; 446/395; 84/470 R, 477 R, 485 R, 478

[56] References Cited

U.S. PATENT DOCUMENTS

| | | | |
|---|---|---|---|
| 2,926,487 | 5/1960 | Stone | 58/152 |
| 3,998,234 | 12/1976 | Stubbmann | 434/263 |
| 4,253,212 | 3/1981 | Fujita | 15/167 |
| 4,934,940 | 6/1990 | Savery | 434/263 |
| 5,244,394 | 9/1993 | Serabian-Musto | 434/263 |

FOREIGN PATENT DOCUMENTS

404024682 A  1/1992  Japan.

*Primary Examiner*—Robert A. Hafer
*Assistant Examiner*—John Edmund Roynak
*Attorney, Agent, or Firm*—Michael B. Jolly

[57] ABSTRACT

A dental hygiene display for instructing and educating children on the proper toothbrush stroke technique, brushing duration, and stroke location including a human mouth figure with toothbrush motion simulation utilizing a liquid crystal display a speech processor and a piezo-electric sound emitting devise. The toothbrush stroke movements are simulated by multiple liquid crystal display segments activated and de-activated in sequence. The multiple liquid crystal display is repeated at various locations within the mouth. Additionally, a microprocessor circuit is provided for controlling of the crystal displays, brush stroke, speed, duration, and location within the mouth, as well as the speech processor and the piezo-electric sound emitting device.

20 Claims, 3 Drawing Sheets

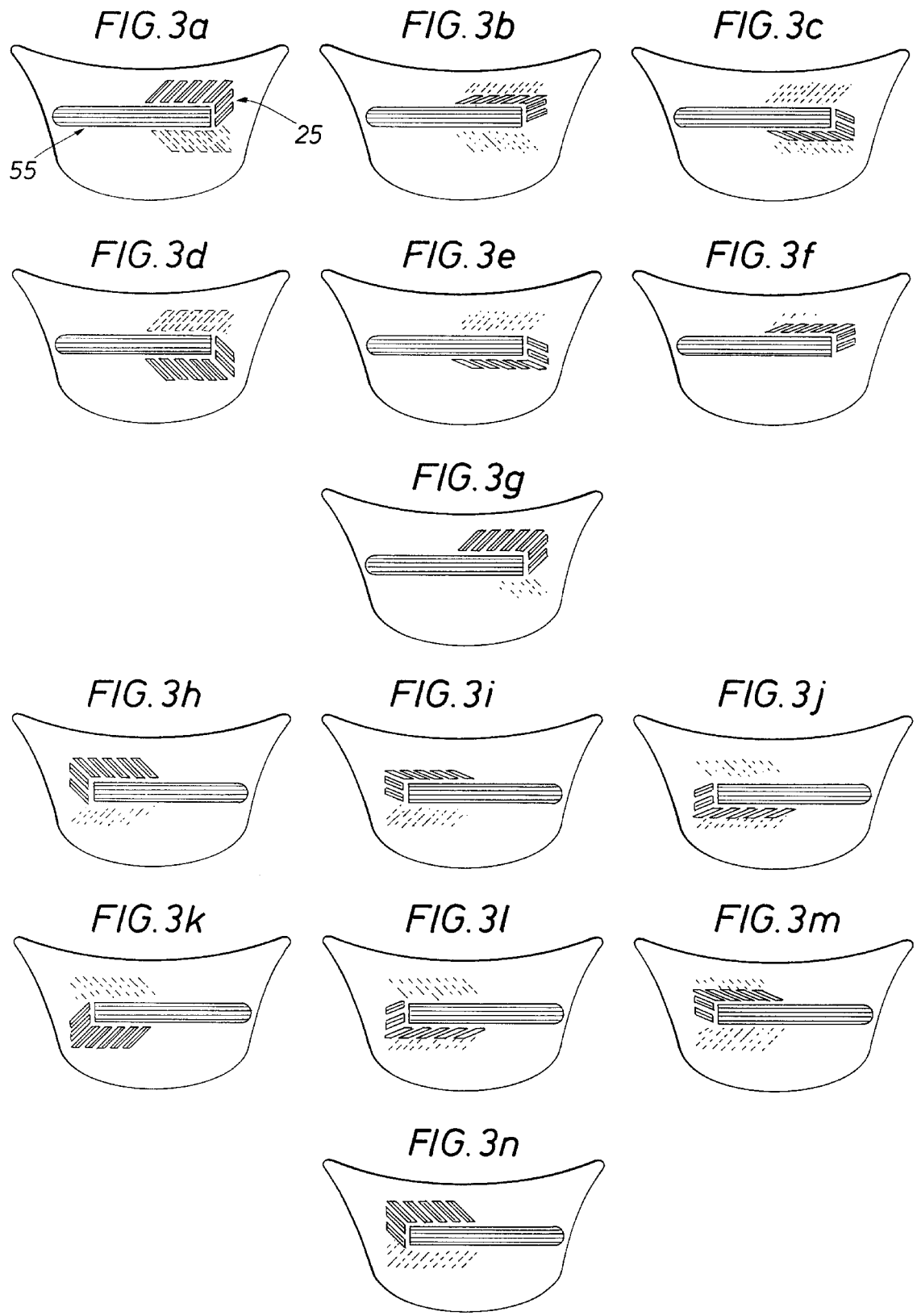

DENTAL HYGIENE INSTRUCTIONAL DISPLAY

INTRODUCTION

This invention relates to a dental hygiene instructional display for instructing and educating children on the proper toothbrush stroke technique including up and down, bass and modified bass, toothbrush stroke duration and more particularly to a microprocessor controlled liquid crystal display simulating tooth brushing motion upon a human tooth figure. Stationary displays, visual devices and sequentially activated audio visual display have long been used by educators and dental hygienist in an effort to educate children about the principles and techniques of dental hygiene. There is a general agreement among dental hygienists that frequent proper tooth brushing is an essential component of proper dental hygiene. The duration of the tooth brushing, the toothbrush stroke technique and the distribution of that technique throughout the accessible surfaces of the teeth and gums within the oral cavity are necessary. Currently available audio and visual devices, however, have tended to concentrate on the duration of the tooth brushing effort, and not upon tooth brushing stroke technique.

Displays such as wall posters illustrating correct distribution of the brushing effort are not widely distributed and are unsuitable for typical home use. Currently available electric, and electronic devices providing written instructions about brushing location have been found to be unsuitable because, at the age at which children are first taught dental hygiene, many such children have not yet learned to read. Furthermore, devices depending upon written instructions are generally unable to capture and hold the attention of children throughout the duration of the tooth brushing effort. Additionally, prior devices cannot be utilized simultaneously while the user is brushing their teeth while looking in a mirror.

Other currently available devices such as those disclosed by Galanis, U.S. Pat. No. 3,783,363, Goldfarb, U.S. Pat. No. 3,170,265, and Stone, U.S. Pat. No. 2,926,487 failed to relate timing of the tooth brushing effort to location and to proper tooth brushing stroke technique. Additionally, the device disclosed by Savery, U.S. Pat. No. 4,934,940 concentrates on duration and the location where brushing is conducted and does not emphasize brush stroke techniques in conjunction with duration and location.

SUMMARY OF THE INVENTION

It is therefore an object of the current invention to provide an improved device for promoting dental hygiene and reinforcing proper dental hygiene behavior. It is another object to provide a display indicating duration, brush stroke technique and location of tooth brushing efforts.

It is still another object to provide a real time liquid crystal display (LCD) image offering guidance related to toothbrush stroke technique, brushing duration, and location of tooth brushing efforts which is readily understandable by children. It is yet another object to provide an audio and visual device to promote and encourage dental hygiene practice among children and to assist children in establishing and maintaining proper tooth brushing habits.

It is still another object of the present invention to provide an audio and visual dental hygiene apparatus for attracting and maintaining the attention of children for purposes of educating children on the proper toothbrush stroke technique, duration, and brushing location.

It is still another object of the present invention to provide a dental hygiene instructional display which can be easily placed near a sink and easily activated by a child for purposes of educating a child on the proper toothbrush technique, duration, and brushing location.

It is still another object of the present invention to provide a dental hygiene instructional display which can be placed near the tooth brushing area or affixed to a mirror and easily activated by the participant.

It is still another object of the present invention to provide a dental hygiene instructional display which can be easily attached to a mirror behind a sink so that the user can simultaneously activate and visualize the instructional display while the user brushes their teeth.

It is still another object of the present invention to provide a dental hygiene instructional display which is water resistant, allowing such display to be utilized near a sink area.

It is still another object of the present invention to provide a dental hygiene instructional display providing a plurality of LCD segments which when sequentially activated demonstrate a proper toothbrush stroke technique.

It is still another object of the present invention to provide a dental hygiene instructional display utilizing LCD segments, a control circuit which activates both the LCD segments and a piezo-electric sound emitting device which complements the LCD sequence.

It is still another object of the present invention to provide a dental hygiene instructional display utilizing a plurality of LCD segments, a speech processor and a control circuit which activates both the LCD segments and the speech processor so that the visualized LCD segments are simultaneously complemented with human speech instructional details offering guidance for proper tooth brushing techniques.

These and other objects are achieved with a dental hygiene instructional display providing a human mouth figure imposed over an LCD, and a control circuit which sequentially activates the LCD segments simulating brush stroke motion, duration, and location of brushing effort. The control circuit also activates a piezo-electric device at a specific rate which coincides with each LCD screen to complement the specific activated LCD segment with music or voice to aid in maintaining the users attention and in reinforcing the users motivation.

BRIEF DESCRIPTION OF THE DRAWINGS

A more complete appreciation of this invention and many of the attendant advantages thereof, will be readily apparent as the same becomes better understood by reference to the following detail description when considered in conjunction with the following drawings in which like reference symbols indicate the same or similar components, wherein;

FIG. 3a–3n show the human mouth representations depicting toothbrush stroke position associated with each liquid crystal display segment activated during successive time intervals;

DETAIL DESCRIPTION OF THE INVENTION

Figure 1:
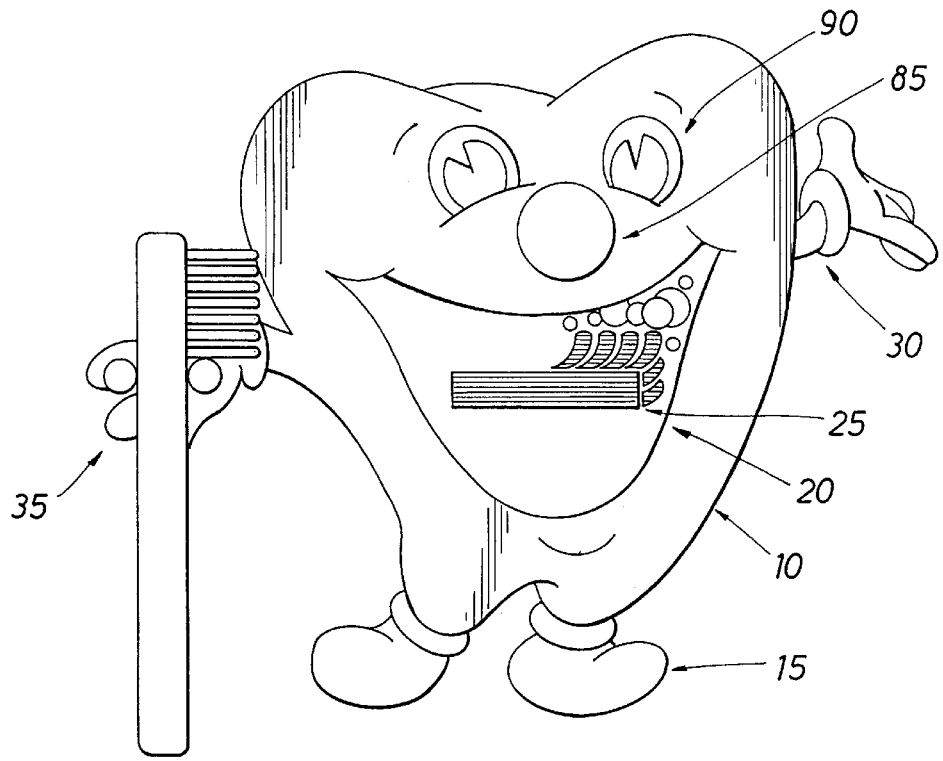
FIG. 1 is a front view of a tooth figure displaying a facial expression exhibiting a human mouth representation imposed over a liquid crystal display.

Referring now to the figures, and in particular to FIG. 1, a character such as a human tooth 10 shown stands upright upon two feet 15 and displays an oral facial expression 20 with a translucent mouth outline depicting a representation of a human mouth thereon. The liquid crystal display segments 25 are positioned such that the sequentially activated LCD segments are visualized upon and within the mouth outline figure. The tooth FIG. 10 also has two human like arms 30 one of which acts as a toothbrush holder 35 formed between the fingers of the hand. The hands, feet and back of the figure are most preferable constructed of sufficiently rigid waterproof material as to support the figurine, toothbrush and LCD circuitry. The face of the tooth figure most preferably is human like in character, with a nose 85 eyes 90 and a smiling oral expression 20. Additionally, the face is constructed of a waterproof impact resistant plastic or other suitable material which will accomplish the desired goals.

Figures 2A, 2B:
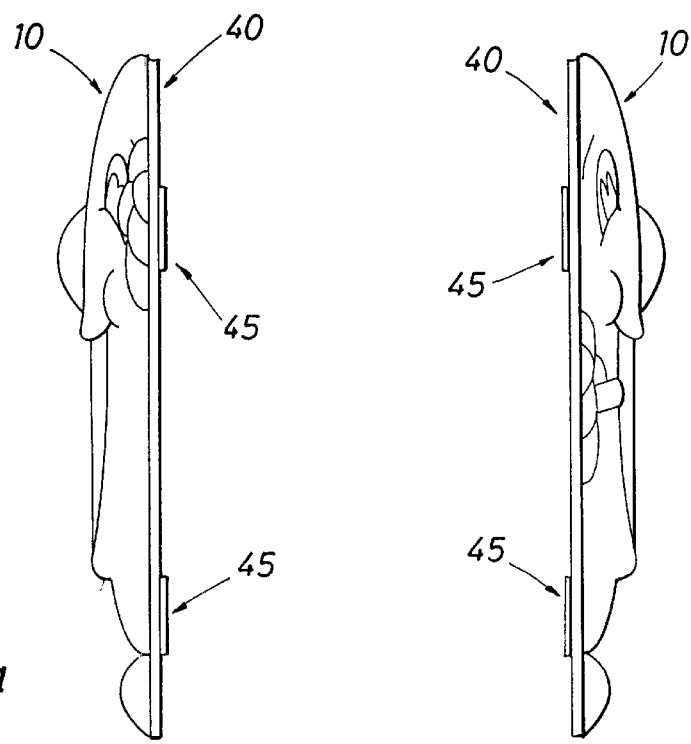
FIG. 2a–2b are side views of the human tooth figure.

Referring now to FIG. 2a–2b in conjunction with FIG. 1. The tooth FIG. 10 is mounted to a plastic back support 40. The back support 40 is most preferable constructed of a sufficiently rigid plastic material as required to support the display and for mounting purposes. Means for attaching the display to a surface are provided 45, most preferable adhesive pads, however, velcro, snaps, magnets or other suitable means may be employed.

Figure 4:
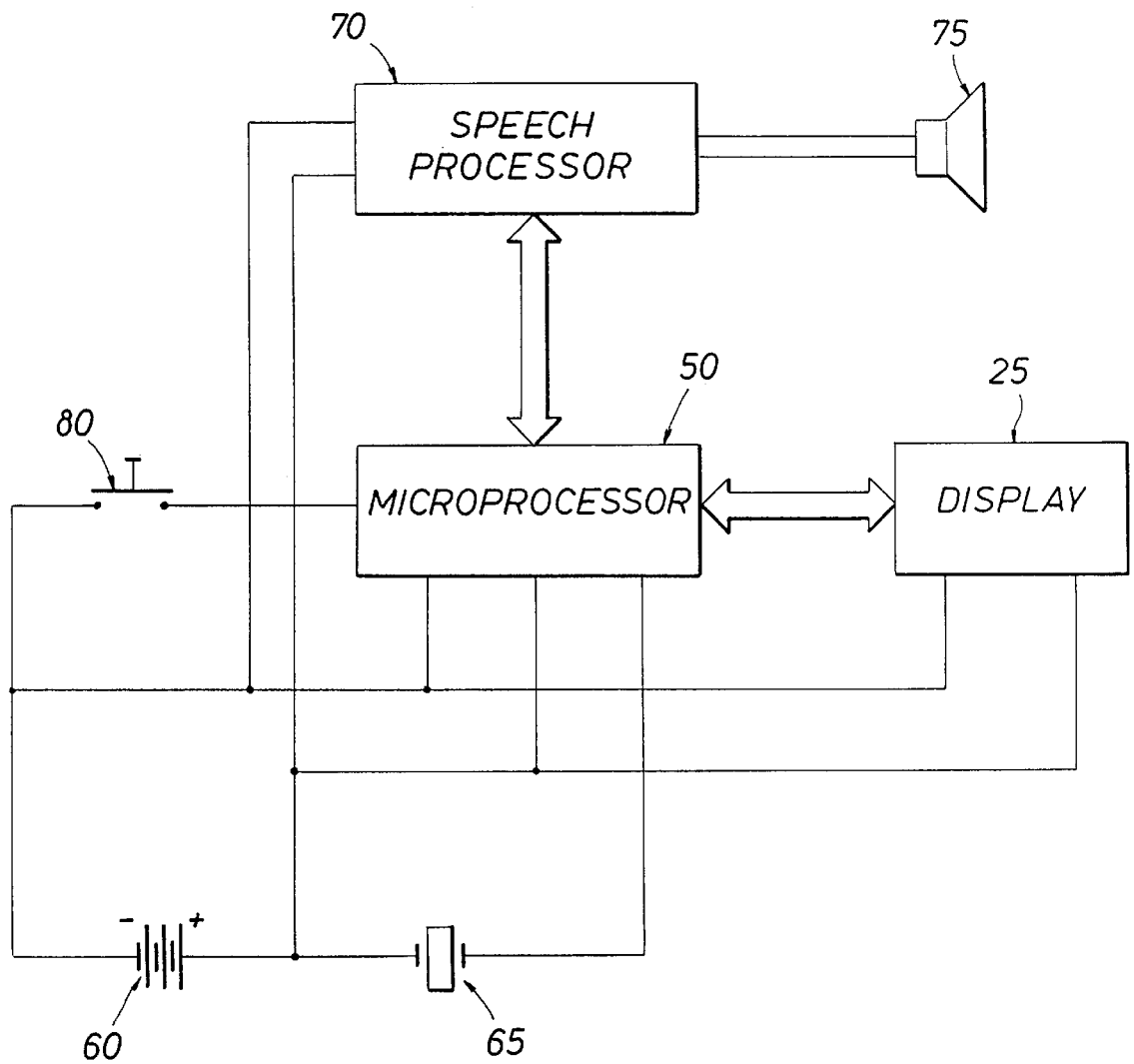
FIG. 4 is a schematic diagram of an electrical circuit for controlling the sequential display of the liquid crystal display segments the speech processor and the piezo-electric audible sound generator.

Referring now to FIGS. 3a–3n and 4 in conjunction with FIGS. 1 and 2a–2b, the LCD segments are each sequentially and individually activated utilizing the microprocessor 50. The LCD construction, design and imagery depicting designs such as different brush stoke positions 25 as in FIGS. 3a–3n is well known in the art. The number of LCD segments needed or desired for the specific application can be varied, however, a greater number of segments results in a smoother simulated brush motion. The total number of LCD segments may be limited by power constraints and the size of the unit. The most preferred embodiment of the devise utilizes 12 LCD segments, both fewer or more LCD segments may be utilized depending on factors such as cost, size, power desired, and which tooth brushing technique is illustrated. Simulated brush stroke movement is accomplished by rotating each simulated brush handle 55 along its longitudinal axis in varying degrees. Each successive LCD segment 3a–3n depicts a simulated toothbrush 25 in a slightly different angle view which when the segments are sequentially viewed depicts an animated sweeping brush motion. Then entire sweeping brush motion cycle is depicted in FIG. 3a–3n. The complete toothbrush cycle is conducted in all quadrants of the mouth figure when the first mouth side cycle 3a–3g is completed the image is then inverted and successive LCD screens are then activated to depict sweeping toothbrush motion on the opposite side of the mouth figure as depicted in 3h–3n.

Additionally brush motion may be depicted including a circular motion or the so-called "Bass Method" or "Modified Bass Method". The brush circular motion may be simulated by both rotating each successive brush image, along the longitudinal axis of the brush handle 55 as described above, and also sequentially moving the entire brush longitudinally along the brush handle. The plurality of sequential longitudinal movements results in a back and forth stroke movement of the entire toothbrush. The longitudinal movement coincides with the rotational movement in the back and forth cycle which, when the LCD segments are viewed through their entire cycle, depict a circular brush movement.

FIG. 4 shows a circuit for driving the LCD segments including a power supply, comprising a battery 60. The power supply may include the battery 60 or a plug connectable to a 120 volt current, transformer or other device needed to control or monitor input voltage. The liquid crystal display 25 is controlled and timed by the microprocessor 50. The microprocessor 50 controls the activation of specific LCD segments to indicate the brushing motion. The microprocessor 50 also generates the various tones in the piezo-electric device 65 by vibrating the piezo-electric device 65 at specific audible frequencies in sequence with the activation of specific LCD segments 25. The piezo-electric device 65 is the most preferred embodiment, however, other means for generating voice, music or tone changes may be employed. The microprocessor 50 will go into an inactive state after the brushing and audible sequence is completed. Piezo-electric device 65 vibrates when voltage is applied to it. As voltage is turned on and off at a specific rate utilizing the microprocessor 50 and audible sound is generated. The audible sound may vary in tone and pitch coinciding with each LCD segment thus depicting a brush sweeping motion and a complementary audible sequence. The microprocessor also directs the speech processor 70 to output voice messages through speaker 75. The voice messages to speaker 75 are activated in sequence with the activation of specific LCD segment 25 and audible tones generated by the piezoelectric device 65. The speaker 75 converts the electrical impulses output from the speech processor 70 to audible sounds that can be heard by humans. The audible sequence may be either voice guidance, music or certain tone changes or a combination thereof. The audible device could serve not only to give verbal guidance but also serve as a means to attract and hold the attention of the child user. The push button switch 80 is a momentary close switch which will activate the microprocessor 50 to start the LCD 25 activation sequence and the piezo-electric device 65 and sound operation from the speech processor 70. After the sequence is started, the push button switch 80 has no other function until the sequence ends. The push button is most preferable located on the nose 85 of the tooth figurine so that the user depresses the figurine's nose 85 to active the device.

The LCD devise and its electric circuitry most preferably is contained within a waterproof plastic or other suitable material so that the figurine can be placed near a bathroom sink without the threat of damage to the electrical circuitry by moisture intrusion.

The push button switch 80 also preferably is contained within the same or a similar waterproof environment as the electrical circuitry and most preferably a flexible plastic permitting the activation of the push button switch 80 by depressing the switch through the plastic container.

Additionally, although the LCD is displayed and supported in a tooth figurine, other figurines or devices may be used to support the LCD segments including advertisements, promotional figurines or mouth figures, accordingly;

I claim:

1. A dental hygiene instructional display comprising:
   means for providing a humanoid facial expression, a plurality of liquid crystal display segments depicting a plurality of toothbrush positions with a tooth brush handle rotated at varying degrees along a longitudinal axis of the toothbrush handle,
   means coupled to said liquid crystal display segments for controlling and sequentially activating each liquid crystal display segment during successive intervals of time.

2. The dental hygiene instructional display of claim 1, further comprising a means for producing an audible signal so as to audibly compliment the sequentially activated liquid crystal display segments.

3. The dental hygiene instructional display of claim 1 wherein said means coupled to said liquid crystal display segments for controlling and sequentially activating each liquid crystal display segment during successive intervals of time further comprises a microprocessor being dedicated to control the liquid crystal display segments and to activate said segments sequentially thereby depicting an animated toothbrush motion.

4. The dental hygiene instructional display of claim 1 further comprising a waterproof material for purposes of shielding said liquid crystal display segments, and means coupled to said liquid crystal display segments for controlling and sequentially activating each liquid crystal display segment during successive intervals of time from exposure to moisture.

5. The dental hygiene instructional display of claim 1 wherein said humanoid facial expression comprises a mouth figure which is superimposed upon said liquid crystal display segments.

6. The dental hygiene instructional display of claim 1 wherein said means for controlling and sequentially activating each liquid crystal display segment depicts animated sweeping toothbrush motion.

7. The dental hygiene instructional display of claim 1 wherein said means for controlling and sequentially activating each liquid crystal display segment depicts animated circular toothbrush motion.

8. A dental hygiene instructional display comprising:

a human tooth figurine, a human mouth outline imposed upon said tooth figurine, a liquid crystal display mounted within said mouth outline, said liquid crystal display comprising a plurality of liquid crystal display segments each depicting a toothbrush handle and bristles at varying degrees of rotation along a longitudinal axis of the toothbrush handle such that when the liquid crystal display segments are sequentially activated a toothbrush stroking motion is simulated within said mouth outline.

a microprocessor control circuit which sequentially activates the liquid crystal display segments, a means for producing an audible signal, a means coupled to said means for producing an audible signal which activates said means for producing an audible signal in sequence with activation of said liquid crystal display segments.

9. The dental hygiene instructional display of claim 8 wherein said simulated toothbrush stroking motion depicts a circular toothbrush motion.

10. The dental hygiene instructional display of claim 8 wherein said means for producing an audible signal comprises a piezo-electric device.

11. The dental hygiene instructional display of claim 8 wherein said audible signal is selected from a group consisting of human voice, music, and tone changes.

12. The dental hygiene instructional display of claim 8 wherein said human tooth figurine is a figurine standing upright upon two feet and comprising two arms and two hands.

13. The dental hygiene instructional display of claim 12 wherein one of said hands comprises fingers formed to act as a toothbrush holder.

14. The dental hygiene instructional display of claim 12 wherein said human tooth figurine further comprises a nose representation.

15. The dental hygiene instructional display of claim 12 wherein said human tooth figurine further comprises a face representation depicting a nose, and eyes and further comprises a rigid back support providing a means for support and mounting of said display.

16. The dental hygiene instructional display of claim 15 wherein said human tooth figurine is constructed of a flexible plastic waterproof material.

17. The dental hygiene instructional display of claim 15 further comprising a means for supporting said face, representation microprocessor control circuit and liquid crystal display segments.

18. The dental hygiene instructional display of claim 15 wherein said mounting means for said display further comprises adhesive pads, velcro strips, snaps, or magnets.

19. A method for educating and displaying to children proper tooth brushing methods utilizing a dental hygiene instructional display having a liquid crystal display with liquid crystal display segments and an audible noise emitting device, comprising the steps of:

sequentially activating said liquid crystal display segments, said segments comprising a toothbrush depicted at varying degrees of rotation along a longitudinal axis of the toothbrush handle such that sequential activation of the segments simulates tooth brushing motion, simultaneously with the activation of said liquid crystal display segments, activating the audible noise emitting device wherein said noise is selected from a group consisting of music, voice and tone so as to compliment or audibly instruct the user.

20. The method as set forth in claim 19 wherein the sequentially activated liquid crystal display segments depict a circular tooth brushing motion.

* * * * *